Dec. 2, 1952 W. W. MARSTON ET AL 2,620,182
FLUID ACTUATED SUSPENSION DEVICE FOR
VEHICLES, AIRCRAFT, AND THE LIKE
Filed Oct. 11, 1948 3 Sheets-Sheet 1

Inventors
Walter W. Marston
Fred Neale
By Babcock & Babcock
Attorneys

Patented Dec. 2, 1952

2,620,182

UNITED STATES PATENT OFFICE 2,620,182

FLUID ACTUATED SUSPENSION DEVICE FOR VEHICLES, AIRCRAFT, AND THE LIKE

Walter Wilson Marston, Wednesfield, and Fred Neale, Coventry, England; said Neale assignor to said Marston Application October 11, 1948, Serial No. 53,964

13 Claims. (Cl. 267—64)

This invention relates to shock absorbing suspension devices of the fluid actuated type for vehicles, aircraft and the like of the kind embodying a pair of members telescopic with respect to one another adapted to be connected between a vehicle chassis and wheel axle or parts associated therewith to define one or more working spaces adapted to contain hydraulic fluid, pressure variations in said hydraulic fluid due to relative movement of said telescopic members being transmitted by said hydraulic fluid to one or more containers of variable volume adapted to contain compressible fluid, said compressible fluid acting as a spring and adapted to resiliently oppose relative movement of said telescopic members in one or both directions.

The object of the present invention is to provide an improved construction of suspension device of the specified type wherein the telescopic members are maintained at the same predetermined relative positions despite variation of the load on the vehicle so that the suspension device maintains the same degree of resilience regardless of the load carried by the vehicle.

A further object of the present invention is to provide valve means adapted to automatically control the introduction or extraction of hydraulic fluid to and from the suspension device in accordance with operational requirements, and a still further object is to provide valve means whereby the suspension device may be readily charged and recharged with hydraulic and compressible fluids.

Referring to the diagrammatic drawings.

Figure 1:
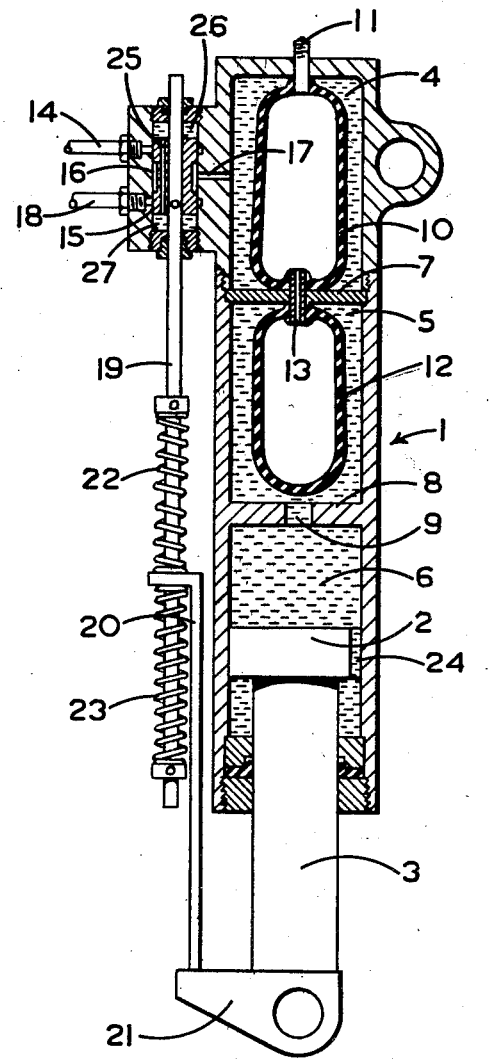
Figure 1 is an elevation in section of a suspension device according to the present invention.

Referring to Figure 1 of the drawings, the pair of telescopic members with respect to one another comprise a cylinder 1 adapted to be connected to a vehicle chassis or associated part and having slidable therein a piston 2 adapted to be connected by the extension 3 to a wheel axle (or part associated therewith) of the vehicle.

The cylinder 1 is divided into three chambers 4, 5 and 6 by means of partitions 7, 8, chamber 4 being sealed from chamber 5 by the liquid tight partition 7, whilst on the other hand the said chamber 5 communicates with chamber 6 by means of an opening 9 in the partition 8.

Chamber 4 contains an air bag 10 of rubber or the like adapted to be inflated by means of the valve 11.

Chamber 5 also contains an air bag 12 similar to air bag 10 and communicating with the latter through the restricted passageway of a connecting member 13 mounted in the liquid tight partition 7.

The chambers 5, 6 and 4 are charged with hydraulic fluid so that the air bags 10 and 12 constitute containers of variable volume containing air or compressible fluid and acted upon by the hydraulic fluid of chambers 4 and 5 respectively.

The chamber 4 is adapted to be supplied with hydraulic fluid from a pump preferably driven by the vehicle engine by means of the pipe 14 through a valve, consisting of a valve member 15 slidable in a valve chamber 16, and duct 17.

Dependant on the position of the valve member 15 the chamber 4 is either supplied with hydraulic fluid from the pump delivery pipe 14 or hydraulic fluid may pass from said chamber 4 to a reservoir for the pump by means of the pipe 18.

The valve member 15 is controlled by a rod 19 engaged by a member 20 secured to an enlargement 21 at the lower end of the extension 3. The member 20 preferably operates the rod 19 in either direction through the intermediary of springs 22, 23.

Thus movement of the piston 2 relative to the cylinder 1 causes corresponding movement of the valve member 15.

In operation when the vehicle is in motion the relatively rapid movement of the piston 2 in the cylinder 1 causes the air bag 12 to be subject to alternate increases and decreases of hydraulic fluid pressure thereon at frequent intervals, and due to the restricted nature of the passageway of the correcting member 13 a negligible quantity of air passes from the bag 12 to the bag 10 and vice versa. Also when the vehicle is in motion the valve member 15 is prevented from rapid reciprocation by means of a restricted passageway 25 through its body connecting the portions 26, 27 of the valve chamber 16 that are filled with hydraulic fluid, the restricted flow of said hydraulic fluid thus permitted through the valve member 15 damping any rapid reciprocation that would otherwise be imparted to it by the rod 19 via the springs 22, 23, from the member 20.

Thus the air bag 12 serves to resiliently cushion the road shocks sustained by the wheel or wheel axle connected to the piston 2 while the vehicle is in motion, the piston 2 assuming a predetermined relative position (as shown) with respect to the cylinder 1 on the vehicle coming to rest.

Upon the load on the stationary vehicle being increased the device tends to contract, increasing the hydraulic fluid pressure on the air bag 12 reducing the size of same and causing air to pass through the connecting member 13 to the bag 10. Simultaneously, due to the contraction of the device the valve member 15 is operated to permit flow of hydraulic fluid from the pump delivery pipe 14 to the chamber 4. This increases the hydraulic pressure in said chamber 4 on the bag 10 so causing air to return to the bag 12 until the latter assumes its previous predetermined volume, by which time the piston 2 and cylinder 1 will have attained their predetermined relative positions and return movement of the valve member 15 will have closed delivery of hydraulic fluid to the chamber 4.

The converse occurs to that just described when the load on the vehicle is reduced, hydraulic fluid being permitted to pass from the chamber 4 by the valve member 15 to the reservoir pipe 18 to permit expansion of the air bag 10 to withdraw air from the bag 12 to allow the latter to contract to its predetermined volume and so cause return of the piston 2 and cylinder 1 to their predetermined relative positions.

Thus despite variation of the load on the vehicle the piston and cylinder are maintained at the same relative positions or approximately so, and due to the air bag 12 being maintained at a predetermined volume the resilience of the suspension device remains practically constant although the pressure of the hydraulic fluid varies.

Although the above described action of the piston and cylinder returning to a predetermined relative position due to load variation on the vehicle has been described as taking place whilst the vehicle is stationary, it is to be understood that such action also takes place whilst the vehicle is in motion, such as after being set in motion immediately after a load variation or being subject to a load variation during motion. Whilst the valve member 15 is not responsive to rapid relative motion of the piston and cylinder it is responsive to comparatively prolonged contraction or extension of the device due to load variation on the vehicle.

In order to permit movement of hydraulic fluid from one side of the piston 2 to the other as it moves in the chamber 6 one or more restricted ducts 24 are provided which also serve to damp the motion of the piston 2.

In a suspension device according to the foregoing only the contraction of the device is resiliently cushioned by an air bag, however, in a similar manner the extension of the device can be similarly cushioned by a third air bag which may be connected through a restricted passageway to a fourth air bag.

Figure 2:
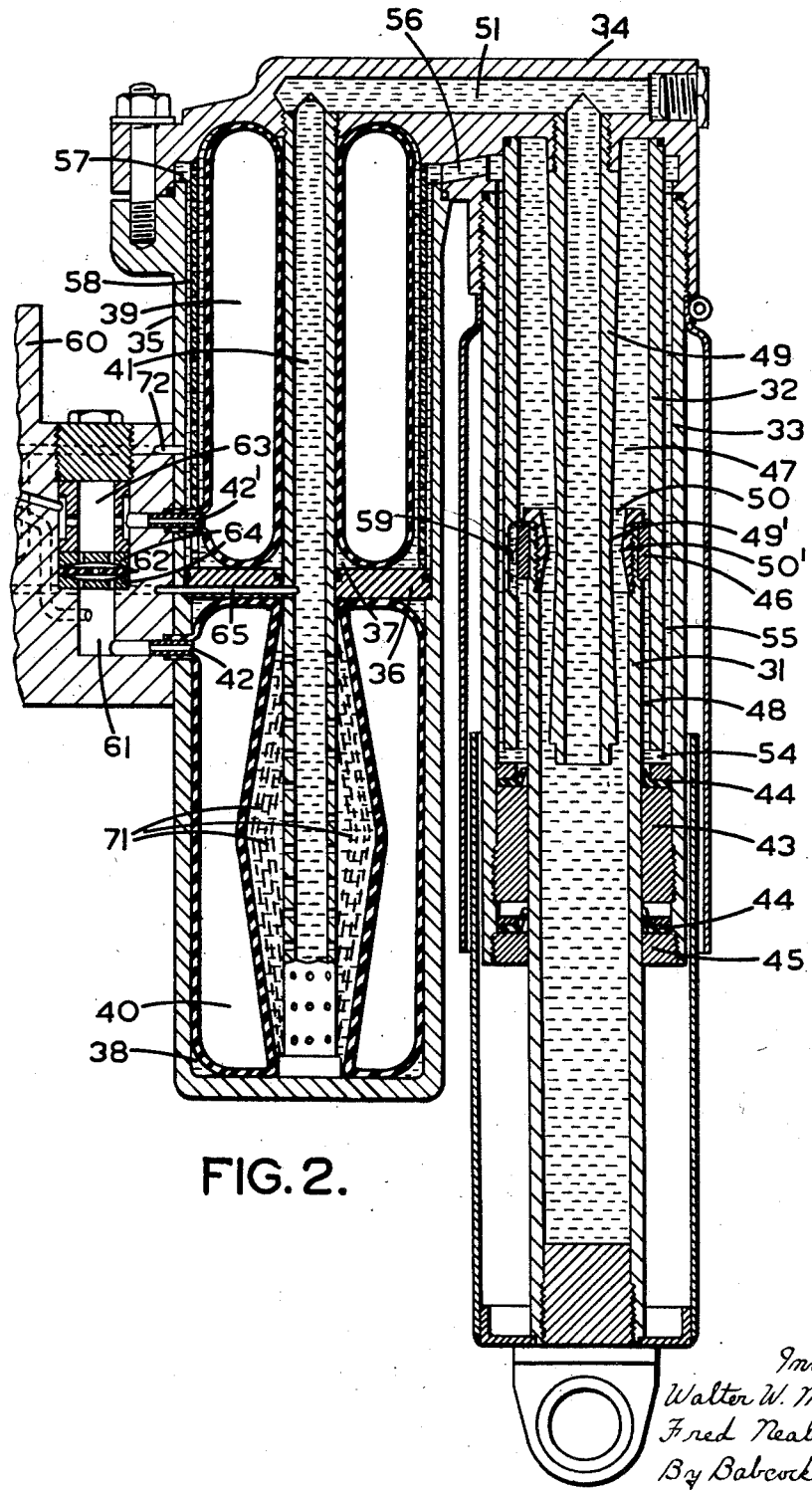
Figure 2 is an elevation in section of a developed embodiment of the present invention.

In Figure 2 there is shown a developed suspension device according to the present invention employing two air bags 39, 40; one bag 39 serving the dual purpose of a cushion against the rebound or extension of the device and also as a second or auxiliary bag to the bag 40 adapted to cushion the contraction of the device.

The piston and cylinder and arrangement of air bags of the suspension device shown in Figure 2 is substantially similar to that described in the specification of U. S. Patent No. 2,521,074, issued on September 5, 1950, and comprises a hollow piston 31 closed at its lower end and adapted to be connected at said end to a wheel mounting or the like, and a cylinder 32 which is located within a cylindrical housing 33, said cylindrical housing being screwed into a head 34.

Bolted to the head 34 is a closed cylindrical container 35 provided with a fluid tight partition 36 to define upper and lower chambers 37, 38 in which are located the inflatable rubber air bags 39, 40.

Figure 3:
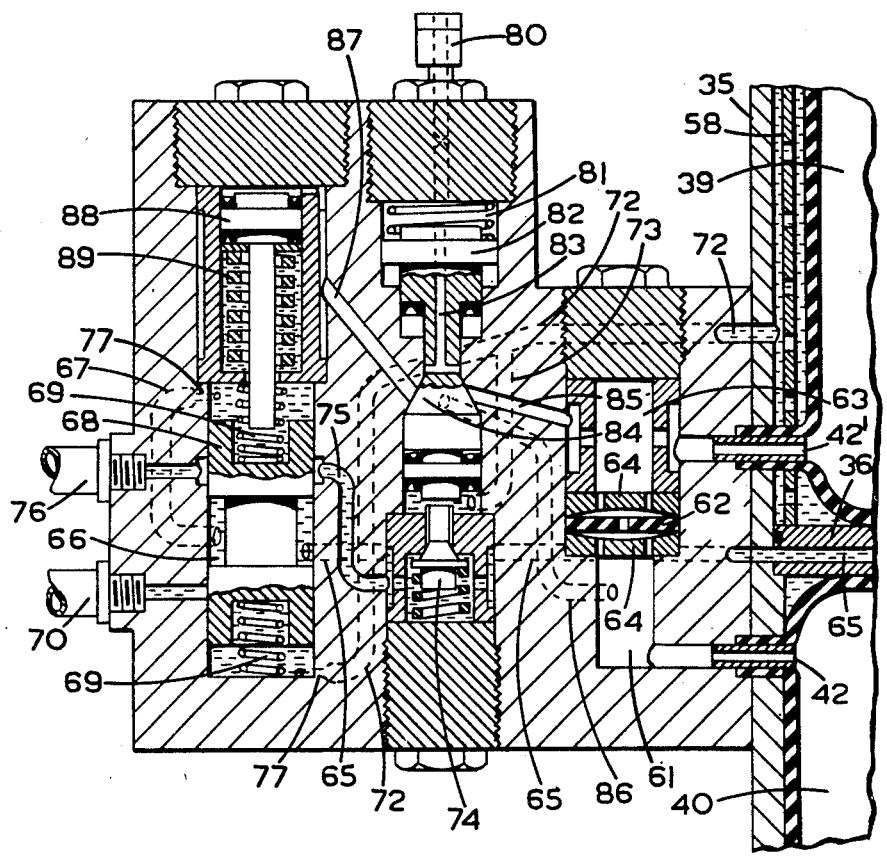
Figure 3 is an elevation in section on an enlarged scale of the valve mechanism of the suspension device shown in Figure 2.

The rubber bags 39, 40 are of annular form and surround a conduit 41 extending from the head 34 to the bottom of the container 35. Each bag is provided with a connection 42, $42^1$ of restricted bore into a block 60 containing valve mechanism hereinafter described with reference to Figure 3.

The head 34 and container 35 are mounted on the vehicle chassis or equivalent in any suitable manner. The cylindrical housing 33 is provided at its lower end with a bushing 43 to form a bearing for the piston 31 to slide therein and also provided with sealing means 44 and a closure member 45.

The hollow piston 31 is provided with an enlarged head 46 to enable it to be a sealing fit in the cylinder 32 and, except as hereinafter described, form a seal between the upper working space 47 and the lower annular working space 48.

A tubular extension 49 from the head 34 extends downwardly therefrom and passes through an opening 50 in the piston 31 into the hollow interior of the latter.

The tubular extension 49 and conduit 41 are connected by a duct 51 in the head 34.

The connection of the bags 39, 40 through the valve block 60, as hereinafter described, is such that when the vehicle is in motion causing the piston 31 and cylinder 32 to have comparatively rapid relative movements, the said bags can be regarded as disconnected and the operation of the device is as follows:

Assuming upward movement of the piston 31 due to the wheel or wheels of the vehicle associated therewith being subject to a road shock or the like, the upper working space 47 is reduced in volume and hence pressure applied to the hydraulic fluid. Thus hydraulic fluid is caused to enter the already full piston 31 through the opening 50 in the head 46 thereof causing fluid to be forced under pressure up the tubular extension 49 which fluid movement is conveyed along the duct 51 to the conduit 41.

The conduit 41 is closed at its lower end and that part of it in the lower chamber 38 is perforated to permit hydraulic fluid to enter said chamber and compress the inflated rubber bag 40.

Thus the hydraulic fluid transmits the pressure created therein due to upward movement of the piston 31, to the air bag 40 which latter functions as an air spring resiliently opposing the movement of the piston 31 and effecting absorption of the road shock or the like.

Due to its inherent resiliency the air bag 40 tends to return to its normal volume reversing the movement of the hydraulic fluid which causes the piston 31 to be returned to its normal position.

In order to resiliently oppose motion of the piston 13 in the opposite direction due to rebound from the above described movement, or when the wheel or wheels encounter a road depression or the like, the lower working space 48 is reduced in volume and applies pressure to the hydraulic fluid causing same to pass through the clearance 54 between the bottom of the cylinder 32 and the upper sealing means 44 into the annular chamber 55 formed between said cylinder 32 and the cylindrical housing 33.

Owing to the annular chamber 55 being already filled with hydraulic fluid some of said fluid is forced under pressure through the short duct 56 in the head 34 to a small annular chamber 57 communicating with the upper chamber 37 wherein the fluid is permitted to pass through a perforated sleeve 58 and compress the inflated rubber bag 39.

Thus in a similar manner to that hereinbefore described with reference to the air bag 40 resiliently opposing upward movement of the piston 31, downward movement thereof is resiliently opposed by the air bag 39 due to transmission of pressure thereto by the hydraulic fluid.

As in the case of the perforations of the conduit 41, perforations of the sleeve 58 cause the hydraulic fluid pressure to be evenly applied to the air bags 39, 40 preventing the latter being subject to localised high pressure, and also in the case of the sleeve 58 blockage of the passage of hydraulic fluid by the bag 39 in chamber 37 is prevented by said sleeve.

In order to damp the motion of the piston in either direction the opening 50 in the piston head 46 is tapered internally to a point $50^1$ of minimum bore. The tubular extension 49 is tapered externally from a point $49^1$ of minimum diameter in either direction. Thus as the piston is moved in either direction the effective opening in the piston head 46 is reduced and due to the throttling of the hydraulic fluid passing therethrough into or out of the piston interior a damping effect on the motion of the latter is created.

When the piston 31 and the cylinder 32 are in the predetermined relative position shown in Figure 2 the piston head 46 is adjacent to one or more grooves 59 in the cylinder wall which enables the working spaces 47, 48 to be communicated for a predetermined extent of piston movement relative to the cylinder 32 to allow for hydraulic fluid pressure equalization either side of said piston head 46 and also enables the device to be charged with hydraulic fluid.

It is to be understood that when the suspension device is charged with hydraulic fluid due to the groove 59 the hydraulic fluid pressure on each side of the piston head 46 is equal although the device is supporting the weight of the vehicle over the wheel or axle with which the device is associated. The reason that the vehicle is supported is due to the fact that a greater area of piston head 46 is presented to the hydraulic fluid or working space 47 than to the hydraulic fluid of working space 48.

In order that the piston 31 and cylinder 32 shall be maintained at the said predetermined relative position when the vehicle is stationary or substantially so despite variation in load thereon and also that the air bag 40 maintained at a predetermined volume, the device functions in conjunction with valves of the valve mechanism block 60 as follows:

On the stationary vehicle being subject to increased load the device tends to contract causing increase of pressure in the working space 47 which pressure increase is transmitted by the hydraulic fluid to the air bag 40 which is thus reduced in volume the air pressure therein increasing.

The air bag 40 is communicated by its connection 42 to a chamber 61 in the block 60 which through a valve incorporating a diaphragm 62 communicates with a further chamber 63 which is connected by the connection $42^1$ to the air bag 39. The diaphragm 62 is provided with a small central bore and is located between recessed members 64 having offset bores therethrough. The arrangement is such that the valve permits restricted flow of air from one air bag to the other provided the air pressures therein are substantially equal, however, on a substantial pressure difference existing between the bags the diaphragm 62 flexes against one of the members 64 and prevents passage of air so that the air bags are disconnected.

Thus with an increase of pressure in the bag 40 it is disconnected from the bag 39 by said diaphragm valve.

At the same time hydraulic fluid passes from the working space 47 via the conduit 41 along a duct 65 in the partition 36 and block 60 to a hydraulic fluid valve chamber 66 and thence by a duct 67 to one end of a valve member 68 slidable in the chamber 66 and normally centrally located therein by springs 69 at each end and hydraulic fluid pressure.

The valve member 68 is caused to move in a downward direction communicating the delivery pipe 70 from a pump driven by the vehicle engine or otherwise, with the duct 65 so that hydraulic fluid is introduced into the working space 47 via said duct 65 and conduit 41.

The piston 31 is thus returned by the hydraulic fluid until on passing the groove 59 the working spaces 47 and 48 are communicated causing equalization of hydraulic fluid pressure throughout the device which causes the valve member 68 to assume the central position shown to stop hydraulic fluid delivery. Hence the hydraulic fluid pressure on the air bag 39 then becomes equal to that on the bag 40 so that the air pressures therein are equalized whereupon the diaphragm valve 62 opens to permit passage of air from the bag 39 to the bag 40 which latter is permitted to extend to its predetermined volume by means of springs 71 moulded in the walls thereof, the air and hydraulic fluid pressures on each side of said walls being otherwise equal.

By virtue of the air bag 40 being maintained at its predetermined volume and the piston 31 and cylinder 32 assuming the same relative position at rest despite increased load on the vehicle, the same degree of resilience is obtained from the device when the vehicle is in motion as prior to loading.

Conversely when the vehicle is unloaded at rest, the device tends to extend increasing the hydraulic fluid pressure in working space 48 and increasing the pressure on and in the bag 39 reducing the volume of same, whilst the hydraulic fluid pressure in working space 47 is reduced which causes the bag 40 to expand. As before the diaphragm valve 62 closes.

Simultaneously hydraulic fluid passes from the chamber 37 via the duct 72 to the other end of the valve member 68 raising same so as to communicate the duct 65 via the chamber 66 to the exhaust pipe 76 to a reservoir for the hydraulic fluid pump.

Hydraulic fluid is exhausted from the device until the movement of the piston 31 causes the working spaces 47, 48 to communicate via the groove 59 causing hydraulic fluid pressure reduction and equalization throughout the device which also causes the valve member 68 to assume its closing position shown, stopping flow of hydraulic fluid from the device.

Owing to hydraulic fluid pressure equalization the air pressures in the bags 39, 40 become equal so that the diaphragm valve 62 opens to allow passage of air from the expanded bag 40 to the bag 39, the bag 40 contracting to its predetermined volume by the action of the moulded-in springs 71.

When the vehicle is in motion the comparatively rapid relative movements of the piston 31 and cylinder 32 cause rapid occurrences of air pressure differences in the bags 39, 40 so that the diaphragm valve 62 remains in effect closed and the bags are disconnected and function as air cushions as herein described.

The likewise comparatively rapid occurrences of hydraulic fluid pressure differences in the working spaces 47, 48 do not cause operation of the valve member 68 by virtue of the bleeds or restrictions 77 where the ducts 67 and 72 communicate with the extremities of the valve chamber 66.

The valve mechanism of the block 60 also enables the device to be charged with air and hydraulic fluid or replenished with air alone owing to diffusion thereof through the walls of the bags.

The device is charged as follows:

A source of supply of air under pressure is connected to an air inlet valve 80 incorporating a non-return valve, the air passing into a chamber 81 to move axially the plunger 82 (having an axial bore 83 therein) to lift the valve 84.

The air thus passes via the bore 83 to ducts 85, 86 to bags 39 and 40 via chamber 63 and connection 42¹ and chamber 61 and connection 42 respectively; and also to duct 87 to act upon the head of a plunger 88 loaded by strong spring 89. On the air pressure in the bags 39, 40 reaching a predetermined value the plunger 88 is caused to be moved axially against the spring 89 so that the lower end of said plunger 88 contacts the valve member 68 to operate same to communicate the pump delivery pipe 70 with the duct 65 and so permit hydraulic fluid to enter the device via said duct to charge the chamber 38, conduit 41, duct 51 and working space 47 for building up a hydraulic pressure therein to move the piston 31 down the cylinder until communication is effected between the working spaces 47, 48 by the groove 59 i. e. the piston 31 and cylinder 32 have attained their relative position. Hydraulic fluid then flows to charge the working space 48, annular chamber 55, short duct 56, small annular chamber 57 and chamber 37. The hydraulic fluid then passes along the duct 72 and duct 73 to close the valve 84 and hence the air supply. The hydraulic fluid also proceeds at the same time via duct 72 to move the valve member 68 to the closing position to cease the supply of hydraulic fluid from the pump, the plunger 88 having risen owing to the predominance of pressure exerted by the spring 89, the hydraulic pressure transmitted from chamber 39 being by then equal to the air pressure on the head of said plunger 88.

The suspension device is then charged with air and hydraulic fluid ready for use.

Owing to the fact that the valve arrangement of the block 60 permits of the air bags 39, 40 to be charged to a predetermined pressure before admission of hydraulic fluid, damage to the moulded in springs 71 of the air bag 40 is prevented which would otherwise occur due to hydraulic fluid pressure, if the said bag were empty or under inflated.

Further the device can be charged and recharged with air from a source the supply pressure of which is, within certain limits, less than that of the working air pressure of the device. This is achieved by virtue of the fact that the head of the plunger 82 is of larger area than the base thereof so that a less air pressure on said head can overcome a greater hydraulic fluid pressure from the device on said base.

From time to time the device requires recharging with air alone owning to molecular diffusion of the latter through the walls of the air bags 39, 40 into the hydraulic fluid surrounding said bags, the air eventually escaping to atmosphere from the hydraulic fluid on occasions when the latter is exhausted to the pump reservoir.

Such loss of air causes loss of volume of the bag 39 (since the bag 40 maintains its volume of air at the expense of that of the bag 39) and the device may be recharged with air alone as follows:

A source of supply of air under pressure at the same or, as hereinbefore stated at a reduced pressure (within certain limits), to the working pressure of the device is connected to the air inlet valve 80, the air passing into the chamber 81 and by virtue of the head of the plunger 82 being greater than the base thereof the pressure of air on the head is able to move the said plunger axially against the pressure of hydraulic fluid from the device acting on the said base. The said base then contacts the spring loaded valve 74 lifting same to permit hydraulic fluid from chamber 37 to pass via ducts 72 and 73, open valve 74 and duct 75 to the exhaust pipe 76 and thus to the reservoir for the pump. At the same time the valve 84 is lifted so that air can pass to the bag 39 to inflate it to the limit permitted by the perforated sleeve 58 surrounding same, the hydraulic fluid displaced by such inflation being expelled from the chamber 37 to the pump reservoir via the valve 74 in the manner just described.

We claim:

1. A fluid actuated suspension device of the character described for supporting a wheel axle from a vehicle comprising in combination a cylinder; a piston slidable in said cylinder, said cylinder and piston defining at least one working space adapted to contain hydraulic fluid; a chamber mounted with said cylinder; ducts communicating said chamber with said working space; a container in said chamber, said container being adapted to have a variable volume and contain a compressible fluid and also be acted upon by hydraulic fluid from said working space; a second chamber mounted with said first mentioned chamber and cylinder; a second container within said second chamber, said second container being adapted to have a variable volume and contain a compressible fluid and also be acted upon by hydraulic fluid; a connector having a restricted passageway communicating said containers; a valve chamber mounted with said second chamber and communicating the latter with an extraneous source of hydraulic fluid; a valve member movable in said valve chamber for controlling the supply of hydraulic fluid to and from said second chamber with which the valve chamber communicates; and operating means responsive to relative movement of said cylinder and piston for automatically operating said valve member in accordance with relative movement of said cylinder and piston so that on the vehicle being loaded or unloaded the said valve member is operated to cause introduction or extraction of hydraulic fluid into or from the said second chamber with which the valve chamber communicates to increase or decrease the hydraulic fluid pressure therein to restore the cylinder and piston to their pre-determined relative position and effect transfer of compressible fluid between said containers so that a predetermined volume of the first mentioned container is maintained in order to maintain the degree of resilient movement of the suspension device under varying load conditions.

2. A fluid actuated suspension device of the character described for supporting a wheel axle from a vehicle comprising in combination a cylinder; a piston slidable in said cylinder, said cylinder and piston defining two working spaces adapted to contain hydraulic fluid; a pair of chambers mounted with said cylinder; ducts communicating each chamber with a corresponding working space; a container in each chamber, each container being adapted to have a variable volume and contain a compressible fluid and also be acted upon by hydraulic fluid from a corresponding working space; a connector having a restricted passageway communicating said containers; a valve chamber mounted with one of said chambers and communicating the latter with an extraneous source of hydraulic fluid; a valve member movable in said valve chamber for controlling the supply of hydraulic fluid to and from said chamber with which the valve chamber communicates; and ducts communicating each chamber with a corresponding end of said valve chamber for hydraulically and automatically operating said valve member in accordance with relative movement of said cylinder and piston so that on the vehicle being loaded or unloaded the said valve member is hydraulically operated to cause introduction or extraction of hydraulic fluid into or from the said chamber with which the said valve chamber communicates to increase or decrease the hydraulic fluid pressure therein to restore the cylinder and piston to their pre-determined relative position in order to maintain the resilience of the suspension device under varying load conditions.

3. In valve and valve operating means according to claim 2 wherein means for charging the suspension device with compressible and hydraulic fluids comprises a compressible fluid inlet valve for connection to a source of compressible fluid under pressure; a valve normally seated by resilient means adapted to be lifted by the pressure of the supplied compressible fluid to admit the latter to said containers of variable volume; a resiliently loaded member operated by the pressure of said compressible fluid on said fluid attaining a predetermined pressure in said containers, said member operating the said valve member to cause supply of hydraulic fluid from the pump to one of said working spaces, and ducts conveying hydraulic fluid from the other working space on the suspension device being fully charged to close said resiliently loaded compressible fluid valve and to operate the said valve member to stop supply of hydraulic fluid from said pump.

4. In valve and valve operating means according to claim 3 wherein means to permit of recharging of the suspension device with compressible fluid alone comprises the said compressible fluid inlet valve for connection to a source of compressible fluid under pressure; the said valve normally seated by resilient means adapted to be lifted by the pressure of the supplied compressible fluid to admit the latter to said second container; a hydraulic fluid valve in communication with the hydraulic fluid from said other working space acting on said second container, said hydraulic fluid valve being opened by said valve which is adapted to be lifted by the pressure of the supplied compressible fluid, to communicate said hydraulic fluid to the pump reservoir, so that hydraulic fluid is permitted to be expelled from the device as the second container expands due to introduction of compressible fluid therein.

5. A fluid actuated suspension device of the character described for supporting a wheel axle from a vehicle comprising in combination a cylinder; a piston slidable in said cylinder, said cylinder and piston defining two working spaces adapted to contain hydraulic fluid; a pair of chambers mounted with said cylinder; ducts communicating each chamber with a corresponding working space; a resilient bag in each chamber, each bag being adapted to have a variable volume and contain a compressible fluid and also be acted upon by hydraulic fluid from a corresponding working space; a connector having a restricted passageway communicating said bags; a valve chamber mounted with one of said chambers and communicating the latter with an extraneous source of hydraulic fluid; a valve member movable in said valve chamber for controlling the supply of hydraulic fluid to and from said chamber with which the valve chamber communicates; and ducts communicating each chamber with a corresponding end of said valve chamber for hydraulically and automatically operating said valve member in accordance with relative movement of said cylinder and piston so that on the vehicle being loaded or unloaded the said valve member is hydraulically operated to cause introduction or extraction of hydraulic fluid into or from the said chamber with which the said valve chamber communicates to increase or decrease the hydraulic fluid pressure therein to restore the cylinder and piston to their pre-determined relative position in order to maintain the resilience of the suspension device under varying load conditions.

6. A fluid actuated suspension device of the character described for supporting a wheel axle from a vehicle comprising in combination a cylinder; a piston slidable in said cylinder, said cylinder and piston defining at least one working space adapted to contain hydraulic fluid; a chamber mounted with said cylinder; ducts communicating said chamber with said working space; a resilient bag in said chamber, said bag being adapted to have a variable volume and contain a compressible fluid and also be acted upon by hydraulic fluid from said working space; a second chamber mounted with said first mentioned chamber and the cylinder; a second resilient bag within said second chamber, said second bag being adapted to have a variable volume and contain a compressible fluid and also be acted upon by hydraulic fluid; a connector having a restricted passageway communicating said containers; a valve chamber mounted with said second chamber and communicating the latter with an extraneous source of hydraulic fluid; a valve member movable in said valve chamber for controlling the supply of hydraulic fluid to and from said second chamber; and linkage connecting said valve member to said piston for automatically operating said valve member in accordance with relative movement of said cylinder and piston so that on the vehicle being loaded or unloaded the said valve member is operated to cause introduction or extraction of hydraulic fluid into or from said second chamber to increase or decrease the hydraulic fluid pressure therein to restore the cylinder and piston to their pre-determined relative positions in order to maintain the resilience of the suspension device under varying load conditions.

7. A fluid actuated suspension device of the character described for supporting a wheel axle from a vehicle comprising in combination a cylinder; a piston slidable in said cylinder, said cylinder and piston defining two working spaces adapted to contain hydraulic fluid; a passageway in said cylinder for communicating said working spaces on the piston and cylinder assuming a predetermined relative position; a pair of chambers mounted with said cylinder; ducts communicating each chamber with a corresponding working space; a container in each chamber, each container being adapted to have a variable volume and contain a compressible fluid and also be acted upon by hydraulic fluid from a corresponding working space; a connector having a restricted passageway communicating said containers; a valve chamber mounted with one of said chambers and communicating the latter with an extraneous source of hydraulic fluid; a valve member movable in said valve chamber for controlling the supply of hydraulic fluid to and from said chamber with which the valve chamber communicates; and ducts communicating each chamber with a corresponding end of said valve chamber for hydraulically and automatically operating said valve member in accordance with relative movement of said cylinder and piston so that on the vehicle being loaded or unloaded the said valve member is hydraulically operated to cause introduction or extraction of hydraulic fluid into or from the said chamber with which the said valve chamber communicates to increase or decrease the hydraulic fluid pressure therein to restore the cylinder and piston to their pre-determined relative position in order to maintain the resilience of the suspension device under varying load conditions.

8. A fluid actuated suspension device of the character described for supporting a wheel axle from a vehicle comprising in combination a cylinder; a piston slidable in said cylinder, said cylinder and piston defining two working spaces adapted to contain hydraulic fluid; a passageway in said cylinder for communicating said working spaces on the piston and cylinder assuming a pre-determined relative position; a pair of chambers mounted with said cylinder; ducts communicating each chamber with a corresponding working space; a resilient bag in each chamber, each bag being adapted to have a variable volume and contain a compressible fluid and also be acted upon by hydraulic fluid from a corresponding working space; a connector having a restricted passageway communicating said bags; a valve chamber mounted with one of said chambers and communicating the latter with an extraneous source of hydraulic fluid; a valve member movable in said valve chamber for controlling the supply of hydraulic fluid to and from said chamber with which the valve chamber communicates; and operating means responsive to relative movement of said cylinder and piston for automatically operating said valve member in accordance with relative movement of said cylinder and piston so that on the vehicle being loaded or unloaded the said valve member is operated to cause introduction or extraction of hydraulic fluid into or from the said chamber with which the said valve chamber communicates to increase or decrease the hydraulic fluid pressure therein to restore the cylinder and piston to their pre-determined relative position in order to maintain the resilience of the suspension device under varying load conditions.

9. A fluid actuated suspension device of the character described for supporting a wheel axle from a vehicle comprising in combination a cylinder; a piston slidable in said cylinder, said cylinder and piston defining two working spaces adapted to contain hydraulic fluid; a passageway in said cylinder for communicating said working spaces on the piston and cylinder assuming a pre-determined relative position; a pair of chambers mounted with said cylinder; ducts communicating each chamber with a corresponding working space; a resilient bag in each chamber, each bag being adapted to have a variable volume and contain a compressible fluid and also be acted upon by hydraulic fluid from a corresponding working space; a connector having a restricted passageway communicating said bags; a valve chamber mounted with one of said chambers and communicating the latter with an extraneous source of hydraulic fluid; a valve member movable in said valve chamber for controlling the supply of hydraulic fluid to and from said chamber with which the valve chamber communicates; and ducts communicating each chamber with a corresponding end of said valve chamber for hydraulically and automatically operating said valve member in accordance with relative movement of said cylinder and piston so that on the vehicle being loaded or unloaded the said valve member is hydraulically operated to cause introduction or extraction of hydraulic fluid into or from the said chamber with which the said valve chamber communicates to increase or decrease the hydraulic fluid pressure therein to restore the cylinder and piston to their pre-determined relative position in order to maintain the resilience of the suspension device under varying load conditions.

10. A fluid actuated suspension device of the character described for supporting a wheel axle from a vehicle comprising in combination a cylinder; a piston slidable in said cylinder, said cylinder and piston defining two working spaces adapted to contain hydraulic fluid to be subject to pressure by the piston in one working space due to a load supported by the device and in the other working space due to extension of the device; a chamber mounted with said cylinder; ducts communicating said chamber with said one working space; a container in said chamber, said container being adapted to have a variable volume and contain a compressible fluid and also be acted upon by hydraulic fluid from said one working space due to a load supported by the device; a second chamber mounted with the said first mentioned chamber and cylinder; ducts communicating said second chamber with said other working space; a second container within said second chamber; said second container being adapted to have a variable volume and contain a compressible fluid and also be acted upon by hydraulic fluid due to extension of the device; a connector having a restricted passageway communicating said containers; a valve chamber mounted with said second chamber and communicating the latter with an extraneous source of hydraulic fluid; a valve member movable in said valve chamber for controlling the supply of hydraulic fluid to and from said second chamber; and operating means responsive to relative movement of said cylinder and piston for automatically operating said valve member in accordance with relative movement of said cylinder and piston so that on the vehicle being loaded or unloaded the said valve member is operated to cause introduction or extraction of hydraulic fluid into or from said second chamber to increase or decrease the hydraulic fluid pressure therein to restore the cylinder and piston to their predetermined relative position and effect transfer of compressible fluid between said containers so that a predetermined volume of the first mentioned container is maintained in order to maintain the degree of resilient movement of the suspension device under varying load conditions.

11. A fluid actuated suspension device of the character described for supporting a wheel axle from a vehicle comprising in combination a cylinder; a piston slidable in said cylinder, said cylinder and piston defining two working spaces adapted to contain hydraulic fluid to be subject to pressure by the piston in one working space due to a load supported by the device and in the other working space due to extension of the device; a chamber mounted with said cylinder; ducts communicating said chamber with said one working space; a resilient bag in said chamber, said bag being adapted to have a variable volume and contain a compressible fluid and also be acted upon by hydraulic fluid from said one working space due to a load supported by the device; a second chamber mounted with the said first mentioned chamber and cylinder; ducts communicating said second chamber with said other working space; a second resilient bag within said second chamber; said second bag being adapted to have a variable volume and contain a compressible fluid and also be acted upon by hydraulic fluid due to extension of the device; a connector having a restricted passageway communicating said bags; a valve chamber mounted with said second chamber and communicating the latter with an extraneous source of hydraulic fluid; a valve member movable in said valve chamber for controlling the supply of hydraulic fluid to and from said second chamber; and operating means responsive to relative movement of said cylinder and piston for automatically operating said valve member in accordance with relative movement of said cylinder and piston so that on the vehicle being loaded or unloaded the said valve member is operated to cause introduction or extraction of hydraulic fluid into or from said second chamber to increase or decrease the hydraulic fluid pressure therein to restore the cylinder and piston to their predetermined relative position and effect transfer of compressible fluid between said bags so that a predetermined volume of the first mentioned bag is maintained in order to maintain the degree of resilient movement of the suspension device under varying load conditions.

12. A fluid actuated suspension device of the character described for supporting a wheel axle from a vehicle comprising in combination a cylinder; a piston slidable in said cylinder, said cylinder and piston defining two working spaces adapted to contain hydraulic fluid to be subject to pressure by the piston in one working space due to a load supported by the device and in the other working space due to extension of the device; a passageway in said cylinder for communicating said working spaces on the piston and cylinder assuming a predetermined relative position; a chamber mounted with said cylinder; ducts communicating said chamber with said one working space; a resilient bag in said chamber, said bag being adapted to have a variable volume and contain a compressible fluid and also be acted upon by hydraulic fluid from said one working space due to a load supported by the device; a second chamber mounted with the said first mentioned chamber and cylinder; ducts communicating said second chamber with said other working space; a second resilient bag within said second chamber; said second bag being adapted to have a variable volume and contain a compressible fluid and also be acted upon by hydraulic fluid due to extension of the device; a connector having a restricted passageway communicating said bags; a valve chamber mounted with said second chamber and communicating the latter with an extraneous source of hydraulic fluid; a valve member movable in said valve chamber for controlling the supply of hydraulic fluid to and from said second chamber; and operating means responsive to relative movement of said cylinder and piston for automatically operating said valve member in accordance with relative movement of said cylinder and piston so that on the vehicle being loaded or unloaded the said valve member is operated to cause introduction or extraction of hydraulic fluid into or from said second chamber to increase or decrease the hydraulic fluid pressure therein to restore the cylinder and piston to their predetermined relative position and effect transfer of compressible fluid between said bags so that a predetermined volume of the first mentioned bag is maintained in order to maintain the degree of resilient movement of the suspension device under varying load conditions.

13. A fluid actuated suspension device of the character described for supporting a wheel axle from a vehicle comprising in combination a cylinder; a piston slidable in said cylinder, said cylinder and piston defining two working spaces adapted to contain hydraulic fluid to be subject to pressure by the piston in one working space due to a load supported by the device and in the other working space due to extension of the device; a chamber mounted with said cylinder; ducts communicating said chamber with said one working space; a container in said chamber, said container being adapted to have a variable volume and contain a compressible fluid and also be acted upon by hydraulic fluid from said one working space due to a load supported by the device; a second chamber mounted with the said first mentioned chamber and cylinder; ducts communicating said second chamber with said other working space; a second container within said second chamber; said second container being adapted to have a variable volume and contain a compressible fluid and also be acted upon by hydraulic fluid due to extension of the device; a connector having a restricted passageway communicating said containers, said connector incorporating a valve comprising a pair of recessed members having ports therein in communication respectively with one of said containers, a diaphragm disposed between said recessed members and having at least one port therein offset with respect to said ports of said recessed members so that whilst the pressures of compressible fluid in said containers are substantially equal compressible fluid may pass in a restricted manner through said ports from one container to the other, but on a substantial compressible fluid pressure difference existing between said containers, said diaphragm flexes against one of said recessed members to prevent passage of compressible fluid therethrough; a valve chamber mounted with said second chamber and communicating the latter with an extraneous source of hydraulic fluid; a valve member movable in said valve chamber for controlling the supply of hydraulic fluid to and from said second chamber; and operating means responsive to relative movement of said cylinder and piston for automatically operating said valve member in accordance with relative movement of said cylinder and piston so that on the vehicle being loaded or unloaded the said valve member is operated to cause introduction or extraction of hydraulic fluid into or from said second chamber to increase or decrease the hydraulic fluid pressure therein to restore the cylinder and piston to their predetermined relative position and effect transfer of compressible fluid between said containers so that a predetermined volume of the first mentioned container is maintained in order to maintain the degree of resilient movement of the suspension device under varying load conditions.

WALTER WILSON MARSTON.
FRED NEALE.

REFERENCES CITED

The following references are of record in the file of this patent:

UNITED STATES PATENTS

| Number | Name | Date |
|---|---|---|
| 1,936,788 | Hardy | Nov. 28, 1933 |
| 2,021,043 | Bedford et al. | Nov. 12, 1935 |
| 2,165,465 | Ehrhardt et al. | July 11, 1939 |
| 2,521,074 | Marston | Sept. 5, 1950 |